United States Patent [19]

Wright et al.

[11] 4,168,045
[45] Sep. 18, 1979

[54] SPEED AND COLLECTIVE PITCH BIAS OF HELICOPTER LONGITUDINAL CYCLIC PITCH

[75] Inventors: Gregory P. Wright, Milford; Don L. Adams, Fairfield, both of Conn.

[73] Assignee: United Technologies Corporation, Hartford, Conn.

[21] Appl. No.: 881,994

[22] Filed: Feb. 28, 1978

[51] Int. Cl.² .......................................... B64C 11/34
[52] U.S. Cl. .............................. 244/17.13; 244/83 G; 244/178; 244/182; 244/196
[58] Field of Search ................. 244/17.13, 83 G, 178, 244/179, 182, 196, 197; 364/440; 416/30

[56] References Cited

U.S. PATENT DOCUMENTS

| | | | |
|---|---|---|---|
| 3,620,488 | 11/1971 | Miller | 244/17.13 X |
| 3,733,039 | 5/1973 | O'Connor et al. | 244/17.13 X |
| 4,103,848 | 8/1978 | Johnson, Jr. et al. | 244/17.13 |
| 4,127,245 | 11/1978 | Tefft et al. | 244/17.13 |

Primary Examiner—Stephen G. Kunin
Attorney, Agent, or Firm—M. P. Williams

[57] ABSTRACT

A bias actuator, such as an extensible link, in the longitudinal cyclic pitch channel of a helicopter is provided with inputs as a function of airspeed multiplied inversely with collective pitch, and as a function of the rate of change of collective pitch stick position, so as to enforce positive angle of attack and speed stability and positive static pitch trim gradient and to decouple collective pitch from the longitudinal cyclic pitch channel at cruise airspeeds, the invention compensates, inter alia, adverse control effects of tail stabilizer surfaces at cruise speeds. A pair of indicators display bias commands and actual bias responses.

6 Claims, 3 Drawing Figures

SPEED AND COLLECTIVE PITCH BIAS OF HELICOPTER LONGITUDINAL CYCLIC PITCH

BACKGROUND OF THE INVENTION

Field of the Invention—This invention relates to helicopter controls, and more particularly to offsetting certain negative speed stability effect, such as those that a large tail stabilizing surface has on the control response and stability characteristics of helicopters at cruise speeds.

Description of the Prior Art—As is known, the stability characteristics of helicopters are very complex, and vary widely from one helicopter design to the next. Just about every individual characteristic of a helicopter affects the stability one way or another.

Of course, certain of the design characteristics play more predominant roles in the stability than do others. The response of the helicopter, both to pilot controls and to inner-loop stability augmentation controls, is of course highly dependent upon the overall stability characteristics of the helicopter. In fact, both the response and the pilot feel of pilot-inputted control demands will vary not only with the design of the helicopter, but in any given helicopter, can be highly dependent upon the instantaneous operating conditions of the helicopter, such as airspeed, attitude, and loading.

There are certain well-known attributes of helicopter response which are desirable for flight stability per se, and are further desirable from the point of view of consistent response to pilot input, and consistent pilot reaction to operating conditions, responses, and external inputs to the aircraft flight conditions (such as wind gusts which affect airspeed or attitude of the helicopter). Examples include the desirability of positive angle of attack stability and positive speed stability, which combine to provide a desired positive relationship between longitudinal cyclic pitch stick position and airspeed (with other controls fixed), which is referred to herein as a positive static pitch trim gradient. To illustrate this feature, consider a helicopter operating at a rather steady cruise speed; a wind gust may impact the helicopter in a manner which alters its pitch attitude, thereby inducing a change in airspeed, or in a manner which may simply impact the aircraft with a sufficient component in the flight vector of the aircraft so as to alter its airspeed directly. Similarly, abrupt changes in air density acting upon the aerodynamic lift, either provided by the main rotor or by tail stabilizing surfaces, may alter the pitch attitude, and thereby provide an undesired input to airspeed. The pilot's natural reaction to a decreased airspeed or a decrease in pitch angle is forward motion of the longitudinal cyclic pitch stick from an initial trim position to cause the helicopter to rotate its nose down, followed by aft motion of the stick to arrest the nose-down rotation at the desired pitch angle for the required airspeed. Ideally, the stick should return to the same trim position in the case where the pilot is restoring a desired speed; and, ideally, the stick should be trimmed forward of the original trim position in the case where the pilot is purposefully increasing airspeed. This is referred to herein as a positive static trim gradient. A corollary to the stability achieved by a positive static trim gradient is the fact that the pilot is therefore provided with a correct relative feel in the cyclic pitch stick: that is, the increased force, which the pilot must provide to the stick to achieve trim at increasingly forward positions, provides a relative indication of speed and/or pitch axis inclination, on a continuous basis for any stick position, regardless of undesirable external inputs to the control system by the environment, or inadvertent pilot inputs.

Another known desirable helicopter flight control characteristic is the decoupling of collective pitch from the pitch axis of the helicopter: stated alternatively, it is desirable that increases or decreases in collective pitch will not cause nose up or nose down angular rotations of the helicopter in its pitch axis which would, in turn, upset the pitch trim.

As is known, a properly designed helicopter may be controlled in stable, maneuverable, descending flight after the loss of motive power to the rotor, in a mode called "autorotation". As stated very simply, the gravitational force allows the rotor to continue to rotate to provide aerodynamic lift, although descent ensues, speed stability is a function of body attitude which is, in turn, dependent on the size and incidence (or attack) angle of tail stabilizing surfaces. But, factors such as performance, center of gravity location and vibration may preemptively dictate size and incidence angle which result in negative speed stability. As long as the rotor is rotating, the cyclic pitch channels will function to permit controlling the attitude of the helicopter. In the conventional, older helicopters which did not have large horizontal tail stabilizing surfaces, loss of rotative power caused the helicopter to drop in essentially a level attitude, the pilot providing a small amount of aft cyclic stick to slow the rate of descent during autorotation, so as to permit a safe, flared landing in the safest available spot.

The design speed (cruise and maximum) of modern helicopters is ever increasing. At higher speeds, the achievement of flight stability is more difficult. When speeds are on the order of 100 knots or greater, stability may be improved with horizontal tail stabilizers which are large in contrast with older helicopters. As can be expected, however, this in turn alters other flight stability characteristics of the helicopter. For instance, a large tail surface can provide aerodynamic vertical lift to the tail which alters the dynamic center of the helicopter as a function of airspeed. Further, the angle of attack of the helicopter in contrast with the velocity vector direction of the helicopter can cause "weathervaning", which is a tendency for the tail surface to lift when it is not oriented along the velocity vector of the aircraft. Therefore, the response of the helicopter to pilot commands in the pitch axis may be influenced (or biased) at cruise airspeeds (eg, above forty or fifty knots) where these aerodynamic effects become significant. Furthermore, one consequence of larger tail surfaces and/or greater tail incidence angle is that changes in collective pitch tend to rotate the helicopter in its pitch axis, due to the aerodynamic lift of the tail (which is considerable at high speeds) remaining fixed, as the lift of the rotor is altered. For instance, in attempting to increase speed or to restore speed (in the examples hereinbefore), the "weathervaning" of a tail surface at high speed must be overcome by longitudinal cyclic stick positioning, such that a reverse static trim gradient exists. In autorotation, the aerodynamic lift to the tail surface will instantaneously cause the forward portion of the helicopter to drop more rapidly than the tail portion, whereas in the past helicopters without tail surfaces would tend to drop in a substantially level fashion. This is further compounded by the heavy loading of modern helicopter main rotors: that is, when rotative power is lost, the helicopter tends to descend at a greater rate than in the case of helicopters with lighter rotor loading. Once the helicopter starts to descend along a nose down glide path in autorotation, the "weathervaning" of the tail results in a greater nose-down pitch angle, accompanied by an increase in its descent speed.

It has been known in the art to provide pitch bias as a function of airspeed alone; however, this has resulted in loss of control margin and increase in sensitivity.

SUMMARY OF THE INVENTION

Objects of the invention include provision of compensation for the aerodynamic lift and weathervaning effects of helicopter stabilizing tail surfaces at cruise speed.

This invention is predicated in part on the discovery that pitch bias responsive to airspeed alone is excessive and undesirable at the highest speeds, in climbs and with heavy loading, and that this undesirable characteristic is due to the stability effects of high collective pitch.

According to the present invention, the longitudinal cyclic pitch channel of a helicopter is provided with a bias input which is a compound function of airspeed and collective pitch, at cruise airspeeds. According to the invention further, airspeed in excess of a threshold speed is multiplied by an inverse function of collective pitch, the product comprising a bias input to the longitudinal cyclic pitch channel in a fashion that at any given airspeed, increasing collective pitch will induce a nose down longitudinal cyclic pitch bias input command, and for a constant collective pitch, an increase in airspeed provides a nose up longitudinal cyclic pitch channel bias input command. In still further accord to the present invention, the rate of change of collective pitch is added into the aforementioned product, thereby to provide a lead response characteristic to changes in collective pitch stick position. According to the invention further, command and response indicators provide a means of visual monitoring for operation and for safety.

The present invention overcomes aerodynamic lift and weathervaning effects of tail stabilizing surfaces at cruise airspeeds. The invention provides compensation for negative speed stability, thereby promoting a positive static pitch trim gradient. The invention provides a tendency for noseup bias at higher airspeeds, which aids the pilot in keeping the nose up in response to the onslaught of autorotation. The invention also decouples short and long term effects of collective pitch from the pitch axis of the helicopter.

The foregoing and various other objects, features and advantages of the present invention will become more apparent in the light of the following detailed description of an exemplary embodiement thereof, as illustrated in the accompanying drawing.

DETAILED DESCRIPTION

Figure 1:
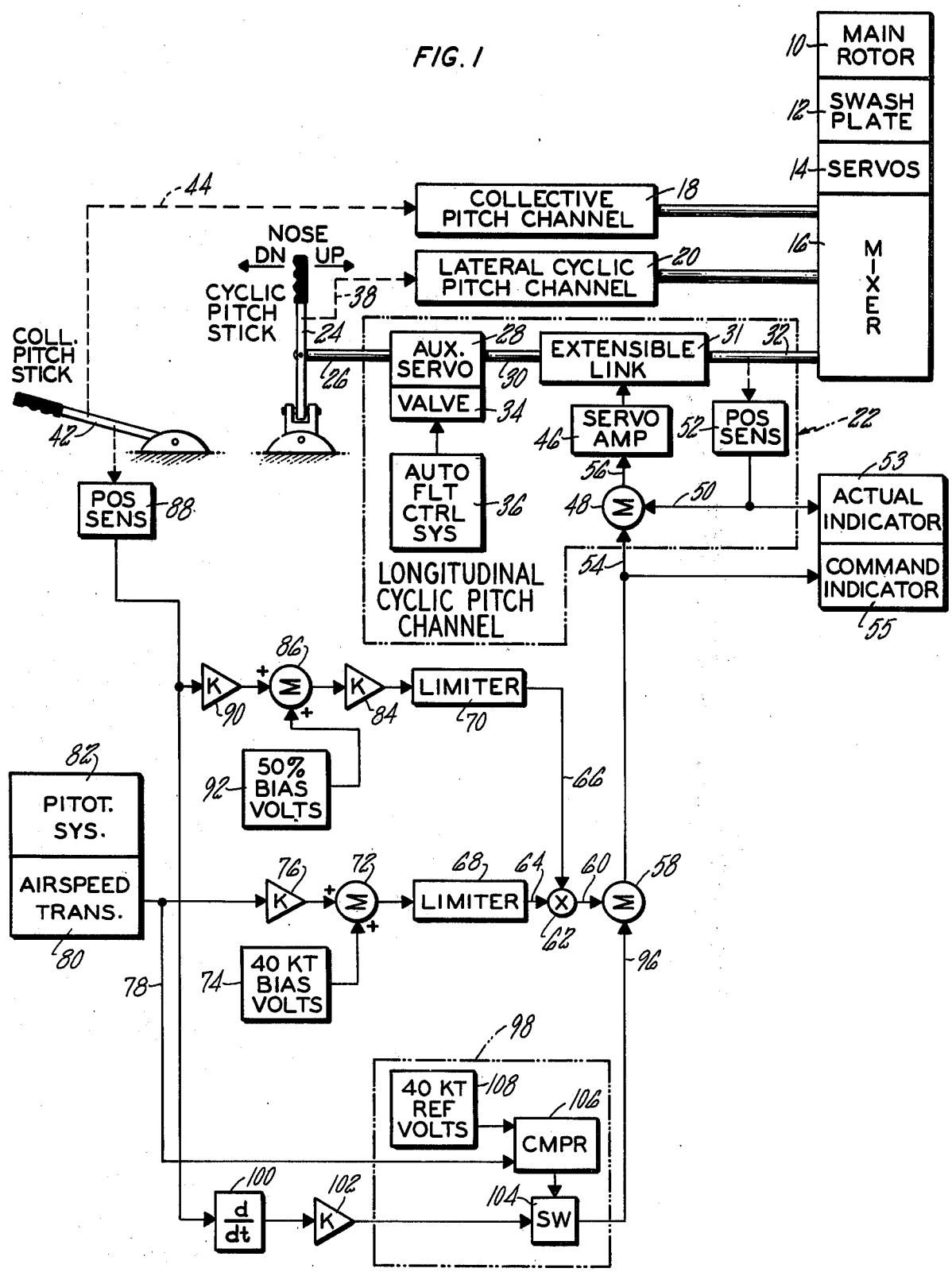
FIG. 1 is a simplified schematic block diagram of a helicopter control system incorporating the present invention.

Referring to FIG. 1, the pitch of the blades of the main rotor 10 of a helicopter is controlled by a swash plate 12 in response to primary servos 14, which relate to the various controllable axes of the swash plate 12. The servos 14 are controlled by a mixer 16 which combines inputs from the three blade-pitch channels of the helicopter, including the collective pitch channel 18, the lateral cyclic pitch channel 20, and the longitudinal cyclic pitch channel 22. The pilot provides inputs to the cyclic pitch channels 20, 22 by means of a cyclic pitch stick 24 which is mechanically connected by suitable linkage 26 to an auxiliary servo 28 the mechanical output of which is applied by suitable linkage 30-32 to the mixer 16. The auxiliary servo 28 is associated with a valve 34, which in response to an automatic flight control system 36, provides limited authority, dynamic stability augmentation inputs, such as short term aerodynamic damping, into the longitudinal cyclic pitch channel by means of the auxiliary servo 28. If desired, the auxiliary servo 28 and valve 34 may be replaced by one or more extensible links, with suitable corresponding changes in the control system design. The cyclic pitch stick 24 is also mechanically connected by means 38 (not shown) to the lateral cyclic pitch channel 20 which operates in a similar fashion. And, as is known, a collective pitch stick 42 is mechanically connected by means 44 (not shown) to the collective pitch channel 18. All of the foregoing is in accordance with teachings well known in the art.

To practice the invention, the linkage 30-32 includes a bias actuator, such as an extensible link 31, of a type known in the art, which is driven in such a fashion to compensate for tail-surface effects at higher airspeeds, to ensure a positive static trim gradient and to decouple collective pitch from the helicopter pitch axis.

The longitudinal cyclic pitch bias is provided by the extensible link 31 in response to a servo amplifier 46 which is associated with a summing circuit 48 that receives an actual bias actuator position feedback signal on the line 50 from a position sensor 52 that senses the actual position of the extensible link 31. The position sensor 52 may be a potentiometer, a linear variable differential transformer, or other position sensor, as is known in the art. Its output provides an input to an actual (or response) indicator 53. The summing circuit 48 compares the actual position signal on the line 50 with a bias command signal on a line 54 so as to provide an error signal on a line 56 to the servo amplifier 46. The bias command signal on the line 54 provides an input to a command indicator 55, for comparison with the response indicator 53, generated by a summing circuit 58, the principal input of which on a line 60 is provided by a multiplier 62, and represents the product of the outputs on lines 64, 66 of a pair of limiters 68, 70 respectively. The limiter 68 eliminates negative voltage excursions of the output of a summing circuit 72 to provide a cruise speed signal that is a linear function of airspeed above 40 knots, as determined by a bias voltage source 74. The airspeed input to the summing circuit 72 is provided through an amplifier 76 from an airspeed signal on a line 78 that is derived from an airspeed transducer 80, which may typically comprise a pressure transducer associated with the pilot-static system 82 of the aircraft, as is known in the art. The bias actuator components 31, 42, 48, 50, 52, 56 and their arrangement are conventional. Because of the bias voltage source 74, the output of the summing junction 72 is negative for all airspeeds less than 40 knots (in the example herein). Since the limiter passes only positive voltages, the input to the multiplier 62 is zero for all airspeeds less than forty knots, and increases with airspeed above forty knots.

Figure 2:
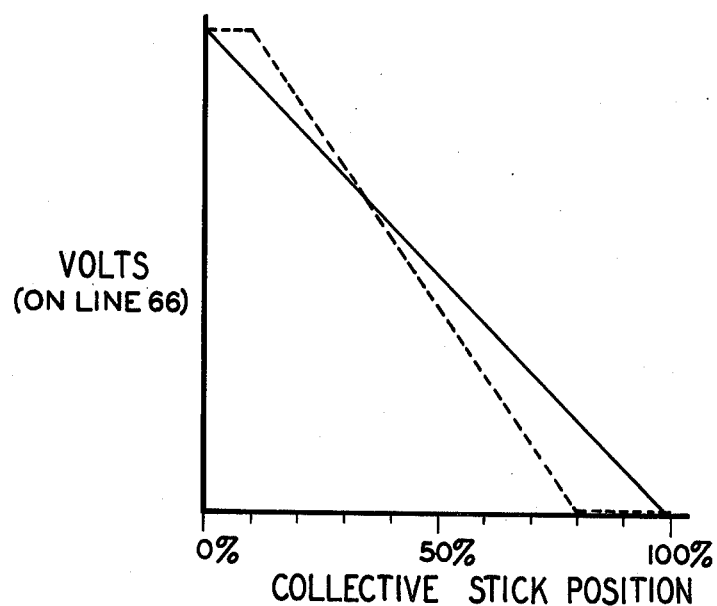
FIG. 2 is a chart illustrating voltage as a function of collective pitch stick position.

The limiter 70 may be utilized to limit the excursions of voltage output from an amplifier 84, which is in turn responsive to a summing circuit 86 that sums the voltages from an amplifier 90 and from a bias voltage source 92. The amplifier 90 is in turn responsive to a position sensor 88 that provides a voltage output that varies as a function of the position of the collective pitch stick 42. Depending on the particular nature of the position sensor 88, the bias voltage 92, amplifiers 90 and 84, and limiter 70 are desirably adjusted so as to provide a voltage as a function of collective pitch stick position of the type illustrated generally in FIG. 2 herein, which may be adjusted as desired to suit the particular utilization of the present invention. For instance, the solid line in FIG. 2 illustrates voltage which is maximum at 0% collective stick position and decreases linearly until it is zero at 100% of collective stick position; on the other hand, the dotted line indicates a case where the voltage is maximum for collective stick positions below 10%, and decreases linearly to zero voltage at 90% or greater. If, as is common, the position sensor 86 is one which provides a maximum negative voltage for 0% collective stick position, zero voltage for 50% collective stick position, and maximum positive voltage for 100% collective stick position, then the bias voltage 92 should be the maximum negative voltage, and this is inverted by the amplifier 84 without any limitation in the limiter 70 so as to produce a solid line in FIG. 2; alternatively, suitable limiting may be provided as desired along with the gain adjustments of the amplifiers and selection of the bias voltage so as to provide for a characteristic as shown by the dotted line in FIG. 2 (or similar varied characteristics), depending on desired response in the helicopter where used.

Figure 3:
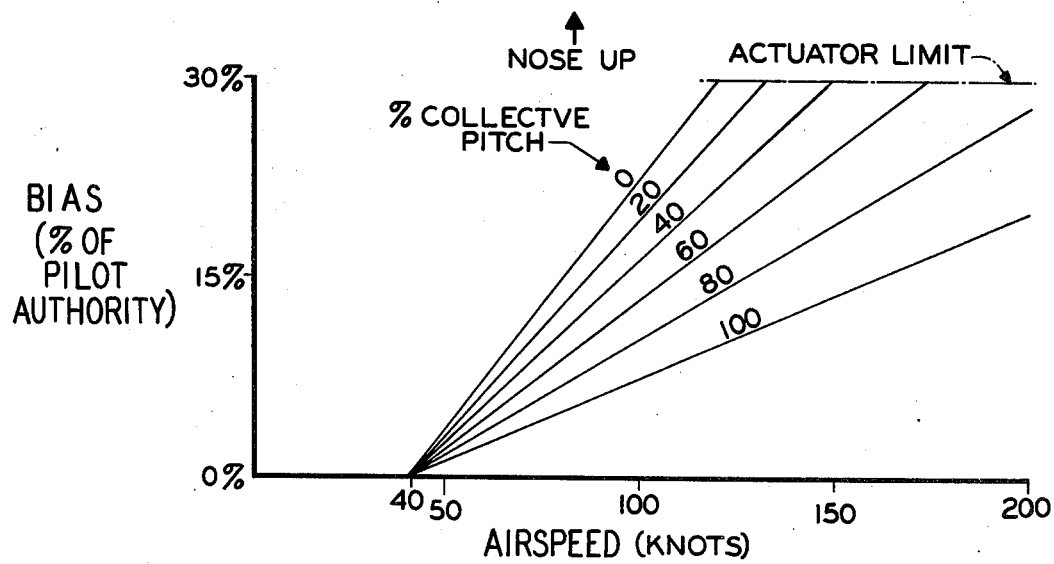
FIG. 3 is a chart illustrating bias provided in accordance with the invention as a function of airspeed and collective pitch.

The voltage output of the limiter 68 on the line 64, which increases positively for airspeeds in excess of forty knots, is multiplied in the multiplier 62 by the voltage which is an inverse function of collective pitch stick position so that the output of the multiplier 62 is zero for all airspeeds less than forty knots, and increases as a function of airspeed which is determined by the collective stick position, as is illustrated in FIG. 3 herein, up to the mechanical limit of bias actuator motion. The polarity of the signal on the line 60 is such as will ultimately cause the extensible link 31 to provide a nose-up longitudinal cyclic pitch command to the mixer 16 in response to increased airspeed. Therefore, the effect of airspeed on the pitch axis is that an increase in airspeed causes an increase in the nose-up longitudinal cyclic pitch input command provided by the bias of the present invention, which in turn will either (1) lower the airspeed or (2) cause the pilot to overcome the bias with forward motion of the cyclic pitch stick (if he desires higher speed), thereby maintaining the positive static pitch trim gradient. Without the bias of the present invention, a helicopter with negative speed stability would respond to a speed decrease with an increase in pitch axis angle (nose-down), causing a further decrease, or would be corrected with backward cyclic stick movement by the pilot. The effect of collective pitch on this action, however, is opposite: for greater collective pitch stick positions, there is less bias of the invention utilized, and bias is maximum for the position of zero collective pitch. This tends to decouple collective pitch from the helicopter pitch axis at higher speeds because of the fact that, at any given airspeed, if collective pitch is increased or decreased, the tendency it would have for a nose-up or a nose-down condition is offset by respectively decreasing or increasing the nose-up bias provided by the airspeed. For maximum decoupling of the collective pitch channel from the pitch axis of the helicopter, a collective pitch lead command is provided as an input to the summing circuit 58 on the line 96 at speeds in excess of forty knots as determined by a speed switch 98, the collective pitch lead function being provided by a differentiator 100 responsive to the position sensor 88 and fed to the switch 98 by a suitable amplifier 102. The forty knots speed switch 98 may, for instance, comprise an electronic switch 104 (such as a FET) which is operated by a comparator 106 when the airspeed exceeds that indicated by a reference voltage source 108, all as is known in the art. Otherwise, the airspeed switch 98 may comprise any suitable airspeed switch available in the art.

Comparison of the command indicator 55 with the actual indicator 53 provides a measure of system operation assurance, since it will reflect differences between indicated desired pitch bias and the response of the bias actuator components to the bias command.

The invention could be altered so as to be used to decrease an excessively positive speed stability, and/or other characteristics. Stated alternatively, the utility of the invention is not limited to applications where the amplitude limits, polarity, or relative polarity (eg, sense of bias response compared to bias-inducing condition and/or sense of speed response compared to sense of collective pitch response) are as described herein.

Thus, although the invention has been shown and described with respect to an examplary embodiment thereof, it should be understood by those skilled in the art that the foregoing and various other changes, omissions and additions in the form and detail thereof may be made therein and thereto, without departing from the spirit and the scope of the invention.

Having thus described a typical embodiment of our invention, that which we claim is new and desire to secure by Letters Patent is:

1. In a helicopter having a longitudinal cyclic pitch control channel and a collective pitch control channel, a pitch bias actuator system comprising:

airspeed sensing means for sensing airspeed of the helicopter and providing an airspeed signal in response thereto;

cruise speed means responsive to said airspeed signal for providing a cruise speed signal which is a function of airspeed above a threshold speed;

means connected to the collective pitch control channel and responsive to the collective pitch command indicated thereby for providing a collective pitch signal indicative thereof;

means responsive to said collective pitch signal for providing an inverse collective pitch signal which varies inversely with the collective pitch command;

bias command means for multiplying said cruise speed signal with said inverse collective pitch signal so as to provide a pitch bias command signal as a compound function of airspeed and the inverse of collective pitch; and bias actuator means responsive to said bias signal for providing a pitch bias input command to said longitudinal cyclic pitch channel.

2. A pitch bias actuator system according to claim 1 additionally comprising:
means responsive to said airspeed signal and to said collective pitch signal to provide at airspeeds in excess of a given airspeed a rate of change of collective pitch signal; and wherein
said bias command means includes means to provide said pitch bias command signal as a compound function of airspeed and the inverse of collective pitch summed with said rate of change of collective pitch signal.

3. A pitch bias actuator system according to claim 1 further comprising:
a command indicator responsive to said pitch bias command signal for indicating bias commands to said bias actuator means;
position sensing means associated with said bias actuator means for sensing the magnitude of pitch bias input provided to said longitudinal cyclic pitch channel by said bias actuator means and providing an actual bias actuator position signal in response thereto; and
an actual indicator responsive to said actual bias actuator position signal for displaying the response of said actual bias actuator means to said bias command signal.

4. A pitch axis bias actuator system according to claim 3 wherein said bias actuator means comprises, with said position sensing means:
an extensible link; and
a servo amplifier associated with a summing circuit, said summing circuit responsive to said bias command signal and said actual bias actuator position signal to provide an error signal for driving said extensible link.

5. A pitch bias actuator system according to claim 1 wherein said pitch bias command signal provided by said bias command means is of a polarity referenced to said bias actuator means such that, at any given airspeed in excess of said threshold airspeed, an increase in collective pitch command provides a nose-down longitudinal cyclic pitch command.

6. A pitch bias actuator system according to claim 5 wherein said bias command means provides said pitch bias command signal of a polarity referenced to said bias actuator means to cause a nose-up longitudinal cyclic pitch command in response to increasing airspeed concurrently with cyclic pitch input commands other than maximum.

* * * * *